United States Patent [19]

Muggli et al.

[11] Patent Number: 4,559,453

[45] Date of Patent: Dec. 17, 1985

[54] SMOKE DETECTOR WITH A RADIATION SOURCE OPERATED IN A PULSE-LIKE OR INTERMITTENT MODE

[75] Inventors: Jürg Muggli; Martin Labhart, both of Männedorf, Switzerland

[73] Assignee: Cerberus AG, Männedorf, Switzerland

[21] Appl. No.: 491,707

[22] Filed: May 5, 1983

[30] Foreign Application Priority Data

May 13, 1982 [CH] Switzerland ........................ 2973/82

[51] Int. Cl.$^{4}$ ............................................ G01N 21/00

[52] U.S. Cl. .................................... 250/565; 250/573; 340/630

[58] Field of Search ............... 250/564, 565, 573, 574, 250/575, 214 AG, 205; 356/438, 439, 336, 337; 340/630

[56] References Cited

U.S. PATENT DOCUMENTS

| | | | |
|---|---|---|---|
| 4,011,458 | 3/1977 | Malinowski | 250/564 |
| 4,185,278 | 1/1980 | Lintelmann et al. | 250/575 |
| 4,203,100 | 5/1980 | Yamauchi et al. | 340/630 |
| 4,260,984 | 4/1981 | Honma | 340/630 |
| 4,317,113 | 2/1982 | Honma | 250/565 |

FOREIGN PATENT DOCUMENTS 2059128 4/1981 United Kingdom .

OTHER PUBLICATIONS

Patent Abstracts of Japan, vol. 3, No. 34, Mar. 22, 1979, p. 127E99.

*Primary Examiner*—David C. Nelms
*Attorney, Agent, or Firm*—Werner W. Kleeman

[57] ABSTRACT

In a line extinction detector using a pulse-operated radiation source, a radiation receiver is connected to an input amplifier of an evaluation circuit. The output pulses generated by the input amplifier are compared to a reference voltage. Circuit elements having a time constant above one minute are provided to adjust either one of the voltage of the output pulses or the reference voltage such that their difference practically becomes zero. The output pulses of the input amplifier are further compared to an alarm threshold derived from the reference voltage and an alarm is triggered when the output signal falls below the alarm threshold value. The output pulses of the input amplifier are also compared to a disturbance threshold value and a disturbance signal is generated when the output signal drops below the disturbance threshold value. A further disturbance signal value is also triggered at preset limits for the compensating adjustment between the output signal of the input amplifier and the reference voltage. A device permits to change the ratio of the alarm threshold value and the reference voltage in order to adapt the sensitivity of the smoke detector to different distances between the radiation source and the radiation receiver.

26 Claims, 2 Drawing Figures

SMOKE DETECTOR WITH A RADIATION SOURCE OPERATED IN A PULSE-LIKE OR INTERMITTENT MODE

CROSS REFERENCE TO RELATED APPLICATIONS

This application is related to the commonly assigned, copending U.S. application Ser. No. 06/328,403, filed Dec. 7, 1981, entitled "Smoke Detector Operating According to the Radiation Extinction Principle", now U.S. Pat. No. 4,547,675, and is also related to the commonly assigned, copending U.S. application Ser. No. 06/386,247, filed June 8, 1982, entitled "Smoke Detector With a Radiation Source Operated in a Pulse-Like or Intermittent Mode", now U.S. Pat. No. 4,506,161, granted Mar. 19, 1985.

BACKGROUND OF THE INVENTION

The present invention relates to a new and improved construction of smoke detector containing a radiation source operated in a pulse-like or intermittent mode.

In its more particular aspects the smoke detector of the present development is of the type comprising a pulse-operated radiation source emitting focussed radiation into a region freely accessible to environmental air, a radiation receiver arranged in the region of said radiation or radiation pulses, and an input amplifier series connected to the radiation receiver and generating output pulses proportional to the intensity of the radiation impinging upon the radiation receiver. There are also provided an evaluation circuit comprising a reference voltage generator for generating a reference voltage for comparison with the output pulses, and an alarm stage defining an alarm threshold for triggering an alarm signal when the output pulses have been attenuated below a predetermined value of the alarm threshold for more than a first predetermined period of time. There is further provided a disturbance circuit or stage defining a disturbance threshold and triggering a disturbance signal when the output pulses have been more rapidly attenuated than during triggering the alarm signal, and wherein the disturbance threshold is lower than the alarm threshold.

A smoke detector of the aforementioned type is known, for example, from German Patent Publication No. 2,822,547. In the smoke detector described therein the radiation source and the radiation receiver are accommodated in two different housings, as is usual in such so-called "line extinction alarms or detectors". These housings are mounted at the walls of the room or area to be monitored at a distance from one another depending on the requisite location of use. A fixed alarm threshold is predetermined which, however, depending upon the different distances between the radiation source and the radiation receiver corresponds to totally different smoke densities.

SUMMARY OF THE INVENTION

Therefore, with the foregoing in mind it is a primary object of the present invention to provide a new and improved smoke detector, the sensitivity of which is not or only insignificantly dependent upon the distance between the radiation source and the radiation receiver.

Another important object of the present invention is directed to a new and improved construction of a smoke detector in which changes in its operative state due to dust accumulation or contamination, aging and temperature fluctuations are rendered ineffective.

Now in order to implement these and still further objects of the invention, which will become more readily apparent as the description proceeds, the smoke detector of the present development is manifested by the features that, there are provided adjusting means for changing the difference between the output pulses of the input amplifier and the reference voltage at a rate corresponding to a time constant larger than one minute such that the difference between the amplitude or level of the output pulses and the reference voltage becomes substantially equal to zero, and a device or element for varying the ratio of the alarm threshold to the reference voltage.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENT

Figure 1:
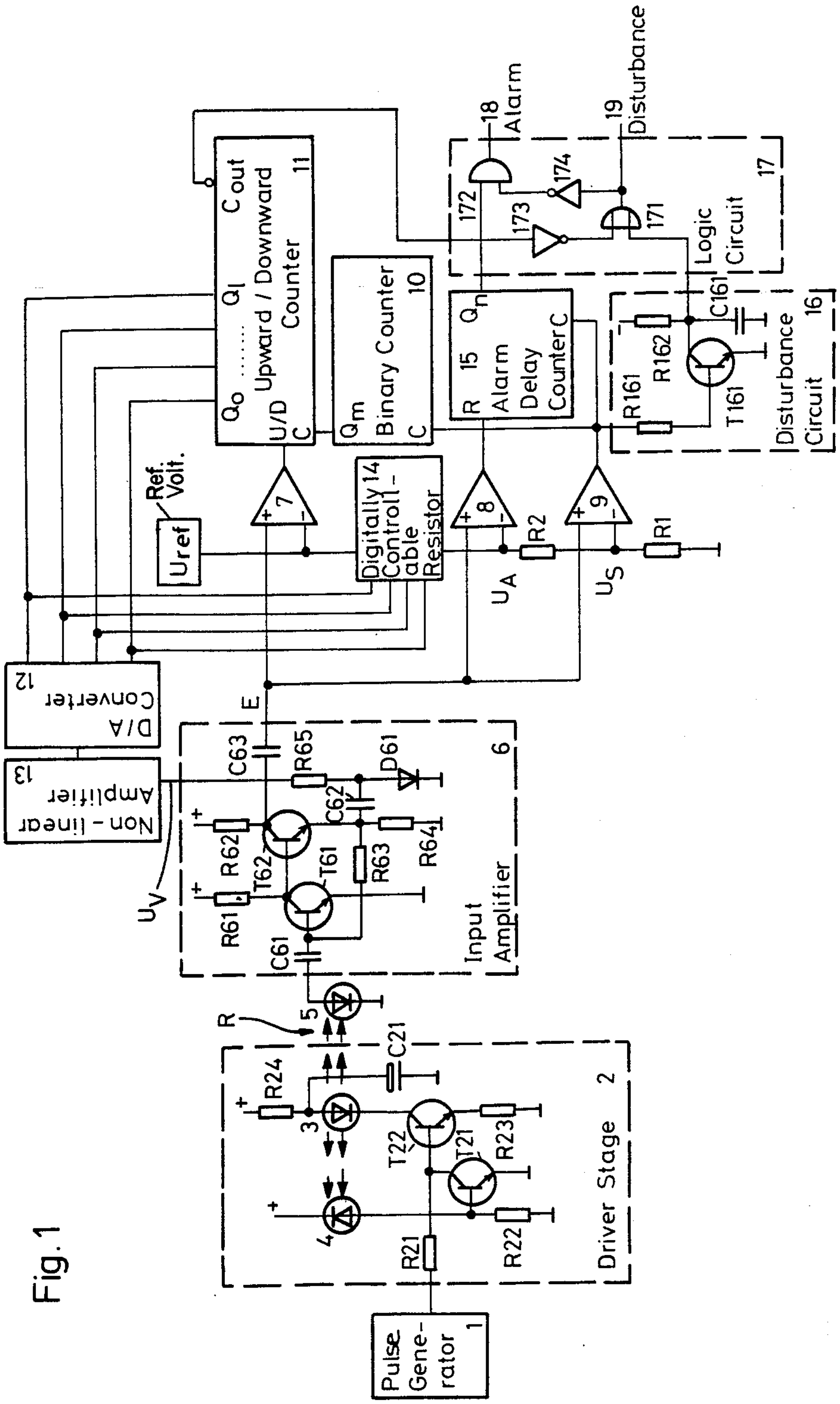
FIG. 1 is a schematic block circuit diagram of a first embodiment of smoke detector constructed according to the present invention.

Describing now the drawings, it is to be understood that only enough of the construction of the smoke detector has been shown as needed for those skilled in the art to readily understand the underlying principles and concepts of the present development, while simplifying the showing of the drawings. Turning attention now specifically to the exemplary embodiment as illustrated by the schematic block circuit diagram of FIG. 1, there has been shown therein the circuitry of a smoke detector comprising a radiation source 3 which in this case is assumed to be constituted by a light or infrared radiation emitting diode LED controlled by a pulse generator 1, which is arranged in close proximity to the radiation source 3, via a driver stage 2. Preferably, the current is regulated by using a reference radiation receiver 4 such that the radiation intensity of the radiation pulses emitted by the radiation source 3 assumes a fixed value. The current flowing through the light-emitting diode 3 is supplied by a capacitor C21, and such current which flows through the light-emitting diode 3 is switched by the transistor T22 and resistors R21 and R23. Between pulses the capacitor C21 is recharged by means of the resistor R24. The radiation intensity is regulated by a regulation circuit 21, 22 containing the transistor T21 and the resistor R22 in combination with the reference radiation receiver 4. A regulation disturbance signal is generated when the regulation exceeds a predetermined threshold. The radiation pulses emitted by the radiation source 3 traverse, in a region R which is freely accessible to environmental air, a predetermined path and impinge upon a radiation receiver 5 arranged in the path of the radiation pulses at a predetermined, but variable distance from the radiation source 3. The radiation pulses impinging upon the radiation receiver 5 generate a pulsed output signal at the output of the radiation receiver 5. The pulsed output signal is received and amplified by a variable gain input amplifier 6 and the thus produced output pulses E are supplied to three comparator circuits 7, 8 and 9. A two-stage transistor amplifier T61, T62 containing the transistors T61 and T62 will suffice for the input amplifier 6, and the operating point of this two-stage transistor amplifier is determined or governed by the resistors R61, R62 and R64. The differential resistance of the diode D61 determines the degree of amplification or gain in conjunction with the feedback resistor R63 and the resistor R62. The quiescent current through the diode D61 and thus the differential resistance of this diode is determined by the voltage $U_V$ and the resistor R65. In this manner the amplification or gain of the input amplifier 6 is controlled. The entire input amplifier 6 is isolated by coupling capacitors C61 and C63.

The output pulses E generated by the input amplifier 6 are fed to an evaluation circuit 7–13 and 15–17 substantially comprising an alarm stage 8 and 15, a disturbance circuit arrangement 9 and 17, and adjusting means 7 and 10–13. Specifically, a comparator or comparator circuit 9 of the disturbance circuit arrangement 9, 16 and 17 constitutes correlating means which correlates the evaluation circuit 7–13 and 15–17 and the radiation pulses emitted by the radiation source 3.

The output of the input amplifier 6 is connected to the positive or non-inverting input of the comparator circuit 9. At the negative or inverting input thereof a voltage $U_S$ is applied which represents a disturbance threshold and which is derived from the reference voltage $U_{ref}$ of a reference voltage generator Ref. volt. by means of the voltage divider R1, R2 and 14. In the presence of a radiation pulse or of an output pulse E generated by the input amplifier 6, a correlation pulse appears at the output of the comparator circuit 9 and is further applied to the clock inputs C of a binary counter 10 and an alarm delay counter 15.

In a disturbance circuit 16 a capacitor C161 is discharged by means of the resistor R161 and the transistor T161 when the correlation pulse is present. When the correlation pulses fail to appear, a disturbance other than smoke is present in the path of the radiation pulses and the output pulses E of the input amplifier 6 are lower than the disturbance threshold $U_S$. The capacitor C161 then is charged via the resistor R162 and a disturbance signal 19 indicative of the presence of the disturbance in the path of the radiation pulses between the radiation source 3 and the radiation received 5 is transmitted by a logic circuit 17 after a predetermined period of time. This logic circuit 17 will be seen to contain an OR-gate 171, the output of which is connected by means of a logic inverter 174 with one input of an AND-gate 172, the other input of which is connected with the alarm delay counter 15. The carry-out output C of an upward/downward counter 11 is connected by means of a logic inverter 173 with one input of the OR-gate 171, the other input of which is connected with the disturbance circuit 16.

The adjusting means 7, 10–13 contain a comparator circuit 7 which compares the voltage of the output pulses E which appear at the output of the input amplifier 6, with the reference voltage $U_{ref}$. The output signal delivered by the comparator circuit 7 is indicative of a difference existing between the output pulse voltage and the reference voltage $U_{ref}$ and controls the counting direction U/D of a digital storage means constituting an upward/downward or forward-backward counter 11. The digital value $Q_0 \ldots Q_l$ of the counter 11 is transformed in a digital/analog converter 12 into an analog voltage from which there is derived a control voltage $U_V$ controlling the variable gain of the input amplifier 6 by means of a non-linear amplifier 13. With each clock pulse arriving at the counter 11 the counter state or level is increased or decreased by one unit in correspondence to the value of the difference at the output of the comparator circuit 7. The variable gain of the input amplifier 6 is thus changed such that the difference between the voltage of the output pulses E and the reference voltage $U_{ref}$ is reduced to substantially zero.

The frequency of the correlation pulses generated by the comparator circuit 9 is divided by a predetermined factor at the binary counter 10 which generates therefrom the clock pulses for the upward/downward or forward-backward counter 11. The follow-up or adjustment thus becomes sufficiently slow, in fact, the rate of adjustment of the input amplifier 6 corresponds to a time constant in excess of 1 minute. Therefore, the adjustment either not or only insubstantially compensates for changes in the output pulses due to an increase in the smoke density, while changes due to slow dust accumulation, aging and temperature fluctuations are compensated.

When the upward/downward or forward-backward counter 11 reaches its upper or lower threshold or limit (zero or $2^{l+1}-1$) no further adjustment or follow-up will be possible. A further disturbance signal may also be derived from the negated carry-out output $C_{out}$ which assumes the value of zero at the counter limits. This value is processed by the logic circuit 17 in order to generate the disturbance signal 19.

The alarm stage 8, 15 contains a comparator circuit 8 by means of which the output pulses E appearing at the output of the input amplifier 6 are compared with an alarm threshold $U_A$ which is derived from the reference voltage $U_{ref}$ by means of a digitally controllable resistor 14 and which differs from the disturbance threshold $U_S$ mentioned further hereinbefore. The output of the comparator circuit 8 controls the reset input of the alarm delay counter 15. In case that the output pulses E remain below the alarm threshold $U_A$, which is indicative of the presence of smoke in the path of the radiation pulses between the radiation source 3 and the radiation receiver 5, the alarm delay counter 15 is no longer reset and the correlation pulses increase the counter state or level. After a predetermined period of time which is longer than the predetermined period of time for the appearance of the disturbance signal 19 at the output of the logic circuit 17, i.e. after a predetermined number of pulses, an alarm signal 18 is delivered, whereas, on the other hand, an alarm signal, due to activation of the logic circuit 17, only will appear if a disturbance signal 19 is not simultaneously present.

The state of the upward/downward or forward-backward counter 11 corresponds to a defined degree of amplification or gain of the input amplifier 6, and thus, to a defined radiation intensity at the radiation receiver 5. The radiation intensity again is a good parameter or measure for determining the distance between the radiation source 3 and the radiation receiver 5, since it is inversely proportional to the square of such distance. The counter state or level $Q_0 \ldots Q_l$ thus is characteristic for a certain distance between the radiation source 3 and the radiation receiver 5. A digitally controllable resistor 14 is controlled by the counter state, and thus constitutes the device 14 by means of which there is automatically adjusted the ratio of the alarm threshold $U_A$ to the reference voltage $U_{ref}$ as a function of the predetermined variable distance between the radiation source 3 and the radiation receiver 5. Preferably, the functional dependency of this ratio upon the aforementioned distance is selected such that the alarm threshold $U_A$ always corresponds to the same smoke density. This is possible by appropriately fixing the transfer function of the non-linear amplifier 13. The ratio of the alarm threshold $U_A$ to the reference voltage $U_{ref}$ can also be manually adjusted by means of a device 14 constructed analogously to the adjustable or variable resistor 14 illustrated in and described with reference to FIG. 2 hereinafter and connected analogously to the digitally controllable resistor 14 illustrated in and described with reference to FIG. 1 hereinbefore.

Figure 2:
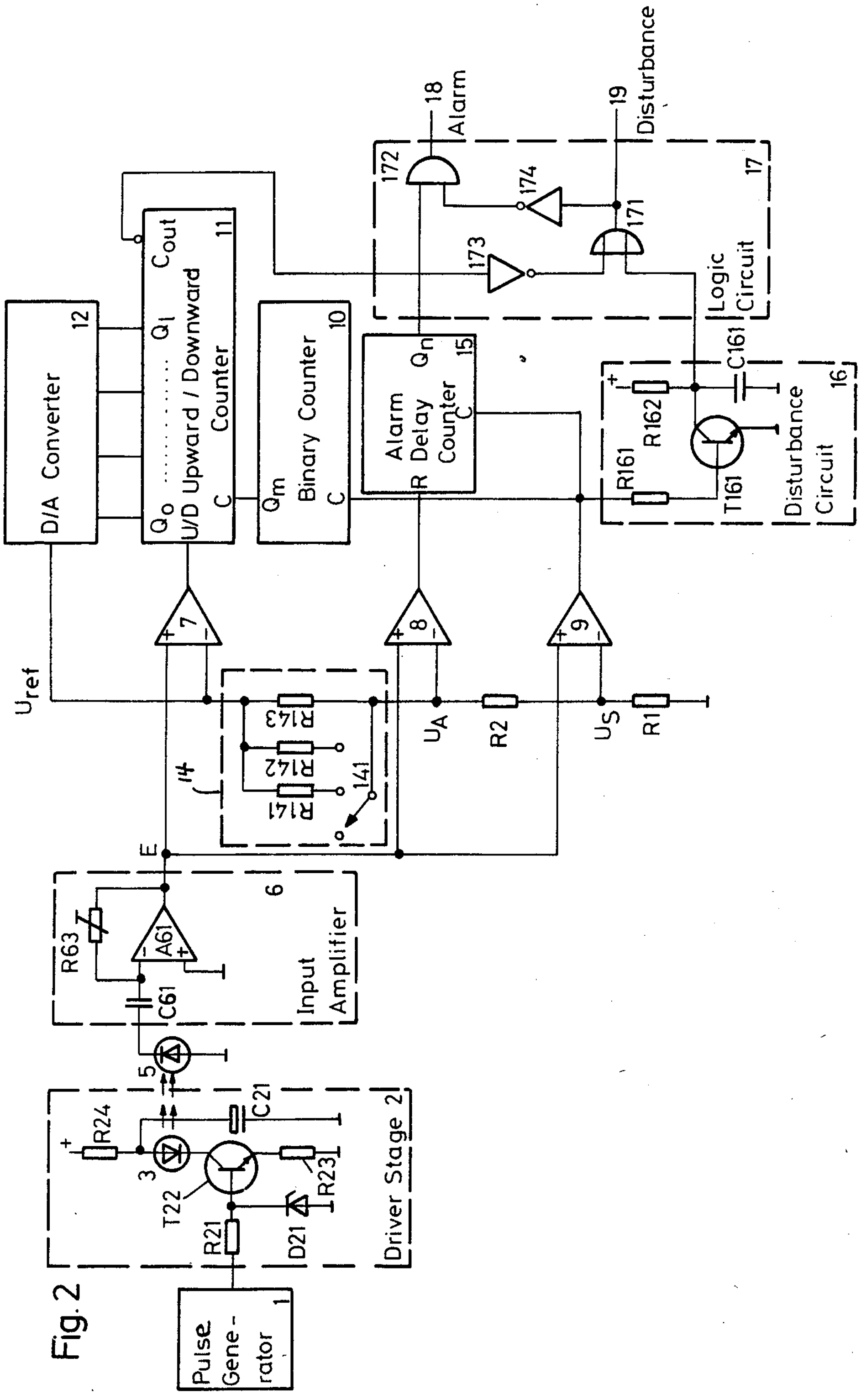
FIG. 2 is a schematic block circuit diagram of a second embodiment of smoke detector according to the present invention.

A second embodiment of the inventive smoke detector has been illustrated by the schematic block circuit diagram shown in FIG. 2, wherein generally the same reference characters have been used to denote the same or analogous components. The pulse generator 1 controls the radiation source 3 via the driver stage 2. The current flowing through the radiation source 3 is switched by the transistor T22 and the resistor R21 and such current is supplied by the capacitor C21 which is recharged between pulses via the resistor R24. However, contrary to the embodiment illustrated in FIG. 1, the current flowing through the radiation source 3 is regulated, with this embodiment of the driver stage 2, by using as the regulation circuit for regulating the radiation intensity emitted by the radiation source 3, a Zener diode D21 and the resistor R23 so that the current flowing through the radiation source 3 assumes a predetermined value. A regulation disturbance signal is generated when the regulation exceeds a predetermined threshold.

The radiation pulses impinging upon the radiation receiver 5 are received and amplified by the input amplifier 6 and the output pulses E thereof are supplied to the evaluation circuit containing the three comparator circuits 7, 8 and 9. The input amplifier 6 comprises an operational amplifier A61 and an adjustable or variable feedback resistor R63 for adjusting the gain to a suitable value when the smoke detector is placed into operation. The capacitor C61 isolates d.c.-components.

The output signals of the comparator circuits 7, 8, 9 are processed in the same manner as has been previously discussed with reference to the embodiment illustrated in FIG. 1. However, the output signal of the digital/analog converter 12 is not used to control the input amplifier 6, but directly represents the reference voltage $U_{ref}$. Due to the slow change in the counter state or level of the upward/downward or forward-backward counter 11 the reference voltage $U_{ref}$ is followed-up or adjusted such that the difference between the voltage of the output pulses and the reference voltage $U_{ref}$ practically becomes zero. The ratio of the alarm threshold $U_A$ to the reference voltage $U_{ref}$ can be varied by a device 14 which, in this embodiment, constitutes an adjustable or variable resistor 14. In this case a switch or switching element 141 is provided for manually adjusting the resistance value of the device or resistor 14 by connecting the resistors R141 or R142 in parallel with the resistor R143. However, it is also possible to replace this resistor arrangement by a continuously variable resistor like, for example, a potentiometer. Furthermore, the ratio of the alarm threshold $U_A$ to the reference voltage $U_{ref}$ can also be automatically adjusted by means of a device 14 constructed analogously to the digitally controllable resistor 14 illustrated in and described with reference to FIG. 1 further hereinbefore and connected analogously to the manually adjustable or variable resistor 14 illustrated in and described with reference to FIG. 2 hereinabove.

The smoke detectors described hereinbefore with reference to the two exemplary embodiments possess a substantially improved stability even over longer periods of time. Slow changes due to dust accumulation or contamination, aging of components and temperature fluctuations are automatically compensated by the adjusting means 7 and 10–13 constituting a follow-up or servo mechanism without the risk of any faulty alarm triggering and without any loss of sensitivity. Furthermore, the smoke detectors as described hereinbefore are distinguished by virtue of their better defined sensitivity which is obtained by adapting the ratio of alarm threshold $U_A$ to reference voltage $U_{ref}$ to the distance between the radiation source 3 and the radiation receiver 5.

While there are shown and described present preferred embodiments of the invention, it is to be distinctly understood that the invention is not limited thereto, but may be otherwise variously embodied and practiced within the scope of the following claims.

Accordingly, what we claim is:

1. A smoke detector comprising:

a pulsed radiation source emitting focussed radiation pulses into a region freely accessible to environmental air;

a radiation receiver arranged at a predetermined variable distance from said radiation source in the path of said radiation pulses and generating a pulse output signal under the action of said radiation pulses;

an input amplifier series connected to said radiation receiver;

said input amplifier generating output pulses of a voltage essentially proportional to the intensity of said radiation pulses impinging upon said radiation receiver;

an evaluation circuit comprising:

a reference voltage generator for generating a reference voltage for comparison with said voltage of said output pulses generated by said input amplifier;

an alarm stage defining an alarm threshold relative to said reference voltage and comparing said voltage of said output pulses generated by said input amplifier with said alarm threshold;

said alarm stage triggering an alarm signal indicative of the presence of smoke in said path of said radiation pulses, when said output pulses generated by said input amplifier have been attenuated below said alarm threshold for more than a first predetermined period of time;

a disturbance circuit defining a disturbance threshold relative to said reference voltage and lower than said alarm threshold;

said disturbance circuit triggering a disturbance signal indicative of the presence of a disturbance other than smoke in said path of said radiation pulses, when said output pulses generated by said input amplifier have been attenuated below said disturbance threshold within a second predetermined period of time shorter than said first predetermined period of time associated with said alarm stage;

adjusting means for comparing said voltage of said output pulses generated by said input amplifier and said reference voltage and, in the case of a difference therebetween, adjusting relative to each other said voltage of said output pulses and said reference voltage at a rate corresponding to a time constant greater than one minute and within a third time period longer than said first and second predetermined periods of time, such that said difference between said voltage of said output pulses and said reference voltage is maintained at a value of substantially zero; and a device for varying the ratio of said alarm threshold to said reference voltage as a function of said predetermined variable distance between said radiation source and said radiation receiver.

2. The smoke detector as defined in claim 1, wherein:

said adjusting means comprises digital storage means for storing said output pulses generated by said input amplifier and differing in their voltage from said reference voltage;

said digital storage means being structured to be changed by at most one unit for each nth clock pulse acting on said digital storage means, wherein $n \geqq 1$; and the direction of said change being dependent upon whether said voltage of said output pulse is greater or smaller than said reference voltage.

3. The smoke detector as defined in claim 2, wherein:

said input amplifier has a variable gain; and said gain being controlled by the output pulses stored in said digital storage means and differing in their voltage from said reference voltage.

4. The smoke detector as defined in claim 2, wherein:

said evaluation circuit is structured such that said reference voltage is controlled as a function of the output pulses differing in their voltage from said reference voltage and stored in said digital storage means.

5. The smoke detector as defined in claim 2, wherein:

said evaluation circuit is structured such that a further disturbance signal is transmitted whenever said output pulses generated by said input amplifier and differing in their voltage from said reference voltage exceed a predetermined upper threshold or lower threshold defined at said digital storage means.

6. The smoke detector as defined in claim 1, wherein:

said ratio of said alarm threshold and said reference voltage which ratio is automatically adjustable as a function of said distance between said radiation source and said radiation receiver, is adjusted as a function of the intensity of said radiation pulses received by said radiation receiver and which intensity is a function of said distance between said radiation source and said radiation receiver.

7. The smoke detector as defined in claim 1, wherein:

said device for varying said ratio of said alarm threshold to said reference voltage comprises a switching element for manual ajdustment of the ratio of said alarm threshold to said reference voltage.

8. The smoke detector as defined in claim 1, wherein:

said disturbance circuit contains a comparator circuit having two inputs and an output;

said inputs being supplied with said output pulses generated by said input amplifier and said disturbance threshold, respectively, and said output supplying correlation pulses as long as said voltage of said output pulses generated by said input amplifier exceed said disturbance threshold;

said output of said comparator circuit being connected to said disturbance circuit, said alarm stage, and said adjusting means; and said comparator circuit constituting correlating means correlating said evaluation circuit containing said alarm stage, said disturbance circuit and said adjusting means to said radiation pulses emitted by said radiation source.

9. The smoke detector as defined in claim 1, further including:

a reference radiation receiver arranged in close proximity to said radiation source;

said reference radiation receiver generating a reference value related to the radiation intensity of said radiation pulses emitted by said radiation source and received by said reference radiation receiver; and a regulation circuit operatively connected with said reference radiation receiver and regulating said radiation source such as to emit radiation pulses of a predetermined substantially constant radiation intensity.

10. The smoke detector as defined in claim 9, further including:

disturbance signalling means for generating a regulation disturbance signal when the regulation of said radiation pulses exceeds a predetermined threshold.

11. The smoke detector as defined in claim 1, further including:

a pulse generator operatively connected to said radiation source in order to produce said focussed radiation pulses; and said pulse generator being arranged in close proximity to said radiation source.

12. The smoke detector as defined in claim 1, wherein:

said device for varying the ratio of said alarm threshold to said reference voltage as a function of said predetermined variable distance between said radiation source and said radiation receiver simultaneously varies the ratio of said disturbance threshold to said reference voltage as a function of said predetermined variable distance between said radiation source and said radiation receiver.

13. A smoke detector comprising:

a pulsed radiation source emitting focussed radiation pulses into a region freely accessible to environmental air;

a radiation receiver arranged in the path of said radiation pulses;

an input amplifier series connected to said radiation receiver;

said input amplifier generating output pulses of a voltage which is essentially proportional to the intensity of said radiation pulses impinging upon said radiation receiver;

an evaluation circuit comprising:

a reference voltage generator for generating a reference voltage for comparison with said voltage of said output pulses;

an alarm stage defining an alarm threshold relative to said reference voltage and comparing said voltage of said output pulses generated by said input amplifier with said alarm threshold;

said alarm stage triggering an alarm signal indicative of the presence of smoke in said path of said radiation pulses, when said output pulses generated by said input amplifier have been attenuated below said alarm threshold for more than a first predetermined period of time;

a disturbance circuit defining a disturbance threshold relative to said reference voltage and lower than said alarm threshold;

said disturbance circuit triggering a disturbance signal indicative of the presence of a disturbance other than smoke in said path of said radiation pulses, when said output pulses generated by said input amplifier have been attenuated below said disturbance threshold for a second predetermined period of time shorter than said first predetermined period of time associated with said alarm stage;

correlating means correlating said evaluation circuit with said radiation pulses emitted by said radiation source;

said correlating means comprising a comparator circuit having two inputs and an output;

said comparator circuit receiving at one of its two inputs said output pulses generated by said input amplifier and said disturbance threshold being applied to the other one of said two inputs of said comparator circuit;

said comparator circuit generating correlation pulses at its output as long as said voltage of said output signals generated by said input amplifier exceed said disturbance threshold; and said output of said comparator circuit being connected to said alarm stage and to said disturbance circuit.

14. The smoke detector as defined in claim 13, wherein:

said evaluation circuit contains follow-up means;

said follow-up means determining and minimizing a difference existing between said voltage of said output pulses generated by said input amplifier and said reference voltage at a rate corresponding to a time constant exceeding one minute; and said follow-up means containing a counter clocked by means of said correlation pulses generated at the output of said comparator circuit and counting difference pulses when said difference exists between said voltage of said output pulses and said reference voltage.

15. The smoke detector as defined in claim 13, further including:

a device for varying the ratio of said alarm threshold to said reference voltage.

16. The smoke detector as defined in claim 14, wherein:

said counter of said follow-up means constitutes digital storage means for storing said difference pulses;

said digital storage means being structured to be changed by at most one unit for each nth correlation pulse, wherein $n \geqq 1$; and the direction of said change being dependent upon whether said voltage of an output pulse generated by said input amplifier is greater or smaller than said reference voltage.

17. The smoke detector as defined in claim 16, wherein:

said input amplifier has a variable gain; and said gain being controlled by the difference pulses stored in said digital storage means.

18. The smoke detector as defined in claim 16, wherein:

said evaluation circuit is structured such that said reference voltage is controlled as a function of the difference pulses stored in said digital storage means.

19. The smoke detector as defined in claim 14, wherein:

said evaluation circuit is structured such that a further disturbance signal is transmitted whenever said difference pulses stored in said counter exceed a predetermined upper threshold or lower threshold.

20. The smoke detector as defined in claim 15, wherein:

said radiation source and said radiation receiver are arranged at a predetermined variable distance; and said device automatically adjusting the ratio of said alarm threshold to said reference voltage as a function of said predetermined variable distance between said radiation source and said radiation receiver.

21. The smoke detector as defined in claim 20, wherein:

said ratio of said alarm threshold and said reference voltage which ratio is automatically adjustable as a function of said distance between said radiation source and said radiation receiver, is adjusted as a function of the intensity of said radiation pulses received by said radiation receiver and which intensity is a function of said distance between said radiation source and said radiation receiver.

22. The smoke detector as defined in claim 15, further including:

said device determining a variable distance between said radiation source and said radiation receiver; and said device containing a switching element for manual adjustment of the ratio of said alarm threshold to said reference voltage as a function of the distance determined between said radiation source and said radiation receiver.

23. The smoke detector as defined in claim 13, further including:

a reference radiation receiver arranged in close proximity to said radiation source;

said reference radiation receiver generating a reference value related to the radiation intensity of said radiation pulses emitted by said radiation source and received by said reference radiation receiver; and a regulation circuit operatively connected with said reference radiation receiver and regulating said radiation source such as to emit radiation pulses of a predetermined substantially constant radiation intensity.

24. The smoke detector as defined in claim 23, further including:

disturbance signalling means for generating a regulation disturbance signal when the regulation of said radiation pulses exceeds a predetermined threshold.

25. The smoke detector as defined in claim 13, further including:

a pulse generator operatively connected to said radiation source in order to produce said focused radiation pulses; and said pulse generator being arranged in close proximity to said radiation source.

26. The smoke detector as defined in claim 20, wherein:

said device for varying the ratio of said alarm threshold to said reference voltage simultaneously varies the ratio of said disturbance threshold to said reference voltage.

* * * * *

UNITED STATES PATENT AND TRADEMARK OFFICE
CERTIFICATE OF CORRECTION

PATENT NO. : 4,559,453

DATED : December 17, 1985

INVENTOR(S) : Jürg Muggli & Martin Labhart

It is certified that error appears in the above—identified patent and that said Letters Patent is hereby corrected as shown below:

Column 3, line 19, after "9", insert --, 16--

Column 5, line 60, after "14", insert --, and thereby the ratio between the alarm threshold and the reference voltage $U_{ref}$ as a function of the predetermined and variable distance between the radiation source 3 and the radiation receiver 5,--

Column 7, line 58, delete "ajdustment", and insert --adjustment--

Column 8, line 25, before "disturbance", insert --regulation--

Signed and Sealed this

*Twenty-ninth* Day of *April 1986*

[SEAL]

*Attest:*

DONALD J. QUIGG

*Attesting Officer* *Commissioner of Patents and Trademarks*